United States Patent
Xiao et al.

(10) Patent No.: US 8,098,816 B2
(45) Date of Patent: Jan. 17, 2012

(54) APPARATUS AND METHOD FOR EVALUATING A CIPHER STRUCTURE'S RESISTANCE TO CRYPTANALYSIS

(75) Inventors: Lu Xiao, San Diego, CA (US); Philip Michael Hawkes, Warrimoo (AU); Gregory Gordon Rose, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 12/253,767

(22) Filed: Oct. 17, 2008

(65) Prior Publication Data
US 2010/0098242 A1    Apr. 22, 2010

(51) Int. Cl.
*H04L 9/28* (2006.01)
(52) U.S. Cl. .......................................................... 380/28
(58) Field of Classification Search ...................... 380/28
See application file for complete search history.

(56) References Cited

U.S. PATENT DOCUMENTS

| | | | |
|---|---|---|---|
| 5,727,062 A * | 3/1998 | Ritter | 380/37 |
| 6,769,063 B1 * | 7/2004 | Kanda et al. | 713/193 |
| 7,043,016 B2 * | 5/2006 | Roelse | 380/29 |
| 7,305,085 B2 * | 12/2007 | Ohkuma et al. | 380/42 |
| 7,340,053 B2 | 3/2008 | Tanaka et al. | |
| 7,460,665 B2 | 12/2008 | Tanaka et al. | |
| 7,613,295 B2 * | 11/2009 | Kurdziel et al. | 380/29 |
| 2001/0024502 A1 * | 9/2001 | Ohkuma et al. | 380/46 |
| 2009/0138710 A1 * | 5/2009 | Minematsu | 713/170 |

FOREIGN PATENT DOCUMENTS
WO    WO 9908411 A2    2/1999

OTHER PUBLICATIONS

International Search Report and the Written Opinion—PCT/US2009/060758, International Search Authority—European Patent Office—Apr. 1, 2010.
Mitsuru Matsui; Supporting Document of MISTY1 Version 1.10: Mitsubishi Electric Corporation Sep. 25, 2000.
A. Menezes, P. Van Oorschot, and S. Vanstone; Handbook of Applied Cryptography, CRC Press, 1996; chapters 1, 2 and 7; pp. 1-86 and 223-282.
Vincent Rumen, Joan Daemen, Bart Preneel, Antoon Bosselaers, Erik De Win; The Cipher Shark, Katholieke Universiteit Leuven, ESAT Cosick, K Mercierlaan 94, B-3001 Heverlee, Belgium;1996.

* cited by examiner

*Primary Examiner* — Saleh Najjar
*Assistant Examiner* — Shu Chun Gao
(74) *Attorney, Agent, or Firm* — Won Tae Kim

(57) ABSTRACT

Disclosed is a method for evaluating resistance to cryptanalysis of a cipher structure having a diffusion element including a linear transformation placed between differently-sized confusion elements at an input and an output of the diffusion element. A generalized minimum number of non-zero symbols at the diffusion element's input and output is determined. The diffusion element's input is divided into subset inputs, each having a size corresponding to the size of each confusion element at the diffusion element input. For each subset input, a subset number of non-zero symbols at the subset input and the diffusion element output is determined. Each subset number is summed to generate a summed subset number. The summed subset number is subtracted from the generalized minimum number to generate a worst-case number. An upper bound of a maximum differential characteristic probability is calculated and used to evaluate the cipher structure.

36 Claims, 6 Drawing Sheets

APPARATUS AND METHOD FOR EVALUATING A CIPHER STRUCTURE'S RESISTANCE TO CRYPTANALYSIS

BACKGROUND

1. Field

The present invention relates generally to evaluating a cipher structure in terms of resistance to differential cryptanalysis and linear cryptanalysis.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR-45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services.

A typical mobile station uses cryptography for secure communications. One type of cryptography uses a cipher structure, such as a substitution-permutation network, which is based on the properties of diffusion and confusion. Diffusion relates to the dependency of output bits to input bits. Transposition (rearranging the order of symbols) and linear transformations are mechanisms of diffusion. Confusion refers to making the relationship between a key and the ciphertext as complex and involved as possible. Substitution, where a symbol is replaced by another, is a confusion mechanism. A substitution box (S-box) is a confusion element. Such cipher structures generally use identically-sized S-boxes to simply design even though the use of differently-sized S-boxes may have cryptographic advantages. One difficulty is the lack of a technique to evaluate a cipher using differently-sized S-boxes in terms of resistance to cryptanalysis, thereby tending to impede the acceptance and use of such cipher structures.

There is therefore a need for evaluating and optimizing a cipher structure in terms of resistance to cryptanalysis, in a cost effective and efficient manner.

SUMMARY

An aspect of the present invention may reside in a method for evaluating resistance to differential cryptanalysis of a cipher structure having a diffusion element including a linear transformation placed between differently-sized confusion elements at an input of the diffusion element and differently-sized confusion elements at an output of the diffusion element. In the method, a generalized minimum number $N_G$ of non-zero symbols at the input and the output of the diffusion element is determined. The input of the diffusion element is divided into subset inputs $S_i$ each having a size corresponding to the size of each confusion element at the diffusion element input. For each subset input, a subset number $N_{Si}$ of non-zero symbols at the subset input and the diffusion element output is determined. Each subset number is summed to generate a summed subset number SN. The summed subset number SN is subtracted from the generalized minimum number $N_G$ to generate a worst-case number $N_W$. An upper bound of a maximum differential characteristic probability $P_D$ is calculated according to the equation:

$$P_D \leq \left( \prod_{i=0}^{i=n-1} (p_{Si})^{N_{Si}} \right) (p_{Sn})^{N_W}$$

where $p_{Si}$ is the maximum differential probability of a confusion element associated with $S_i$, and $S_n$ is associated with a confusion element having a lowest resistance against differential attack. The resistance to differential cryptanalysis of the cipher structure is evaluated based on the calculated maximum differential characteristic probability $P_D$.

In more detailed aspects of the invention, the linear transformation is stored as a baseline linear transformation. The linear transformation is changed to a new linear transformation. The following method steps are repeated for the new linear transformation. A generalized minimum number $N_G$ is determined. A subset number $N_{Si}$ is determined for each subset input. Each subset number is summed to generate a summed subset number SN. The summed subset number SN is subtracted from the generalized minimum number $N_G$ to generate a worst-case number $N_W$. An upper bound of a maximum differential characteristic probability $P_D$ is calculated. The resistance to differential cryptanalysis of the cipher structure is evaluated based on the calculated maximum differential characteristic probability $P_D$. The new linear transformation is selected as the linear transformation for the cipher structure if the evaluation indicates that the new linear transformation provides better resistance to differential cryptanalysis than the baseline linear transformation.

In other more detailed aspects of the invention, each confusion element may be an S-box, and the S-boxes may be maintained fixed between the steps for evaluating the baseline linear transformation and the new linear transformation. The generalized minimum number of non-zero symbols may be a generalized branch number, and each subset number of non-zero symbols may be a subset-specific branch number. Each confusion element may be an S-box having a defined number of inputs and outputs, and the S-box outputs may be determined from the S-box inputs based on a lookup table. The diffusion element may further include a key mixing element.

Another aspect of the invention may reside in an apparatus for evaluating resistance to differential cryptanalysis of a cipher structure having a diffusion element including a linear transformation placed between differently-sized confusion elements at an input of the diffusion element and differently-sized confusion elements at an output of the diffusion element. The apparatus comprises: means for determining a generalized minimum number $N_G$ of non-zero symbols at the input and the output of the diffusion element; means for dividing the input of the diffusion element into subset inputs $S_i$ each having a size corresponding to the size of each confusion element at the diffusion element input; means for determining, for each subset input, a subset number $N_{Si}$ of non-zero symbols at the subset input and the diffusion element output; means for summing each subset number to generate a summed subset number SN; means for subtracting the summed subset number SN from the generalized minimum number $N_G$ to generate a worst-case number $N_W$; means for calculating an upper bound of a maximum differential characteristic probability $P_D$ according to the equation:

$$P_D \le \left( \prod_{i=0}^{i=n-1} (p_{Si})^{N_{Si}} \right)(p_{Sn})^{N_W}$$

where $p_{Si}$ is the maximum differential probability of a confusion element associated with $S_i$, and $S_n$ is associated with a confusion element having a lowest resistance against differential attack; and means for evaluating the resistance to differential cryptanalysis of the cipher structure based on the calculated maximum differential characteristic probability $P_D$.

Another aspect of the invention may reside in an apparatus for evaluating resistance to differential cryptanalysis of a cipher structure having a diffusion element including a linear transformation placed between differently-sized confusion elements at an input of the diffusion element and differently-sized confusion elements at an output of the diffusion element, comprising: a processor configured to: determine a generalized minimum number $N_G$ of non-zero symbols at the input and the output of the diffusion element; divide the input of the diffusion element into subset inputs $S_i$ each having a size corresponding to the size of each confusion element at the diffusion element input; determine, for each subset input, a subset number $N_{Si}$ of non-zero symbols at the subset input and the diffusion element output; sum each subset number to generate a summed subset number SN; subtract the summed subset number SN from the generalized minimum number $N_G$ to generate a worst-case number $N_W$; calculate an upper bound of a maximum differential characteristic probability $P_D$ according to the equation:

$$P_D \le \left( \prod_{i=0}^{i=n-1} (p_{Si})^{N_{Si}} \right)(p_{Sn})^{N_W}$$

where $p_{Si}$ is the maximum differential probability of a confusion element associated with $S_i$, and $S_n$ is associated with a confusion element having a lowest resistance against differential attack; and evaluate the resistance to differential cryptanalysis of the cipher structure based on the calculated maximum differential characteristic probability $P_D$.

Yet another aspect of the invention may reside is computer program product comprising computer readable medium comprising: code for causing a computer to determine a generalized minimum number $N_G$ of non-zero symbols at an input and an output of the diffusion element of a cipher structure having the diffusion element including a linear transformation placed between differently-sized confusion elements at the input of the diffusion element and differently-sized confusion elements at the output of the diffusion element; code for causing a computer to divide the input of the diffusion element into subset inputs $S_i$ each having a size corresponding to the size of each confusion element at the diffusion element input; code for causing a computer to determine, for each subset input, a subset number $N_{Si}$ of non-zero symbols at the subset input and the diffusion element output; code for causing a computer to sum each subset number to generate a summed subset number SN; code for causing a computer to subtract the summed subset number SN from the generalized minimum number $N_G$ to generate a worst-case number $N_W$; code for causing a computer to calculate an upper bound of a maximum differential characteristic probability $P_D$ according to the equation:

$$P_D \le \left( \prod_{i=0}^{i=n-1} (p_{Si})^{N_{Si}} \right)(p_{Sn})^{N_W}$$

where $p_{Si}$ is the maximum differential probability of a confusion element associated with $S_i$, and $S_n$ is associated with a confusion element having a lowest resistance against differential attack; and code for causing a computer to evaluate the resistance to differential cryptanalysis of the cipher structure based on the calculated maximum differential characteristic probability $P_D$.

An aspect of the present invention may reside in a method for evaluating resistance to linear cryptanalysis of a cipher structure having a diffusion element including a linear transformation placed between differently-sized confusion elements at an input of the diffusion element and differently-sized confusion elements at an output of the diffusion element. In the method, a generalized minimum number $N_G$ of non-zero symbols at the input and the output of the diffusion element is determined. The input of the diffusion element is divided into subset inputs $S_i$ each having a size corresponding to the size of each confusion element at the diffusion element input. For each subset input, a subset number $N_{Si}$ of non-zero symbols at the subset input and the diffusion element output is determined. Each subset number is summed to generate a summed subset number SN. The summed subset number SN is subtracted from the generalized minimum number $N_G$ to generate a worst-case number $N_W$. An upper bound of a maximum linear characteristic probability $P_L$ is calculated according to the equation:

$$P_L \le \left( \prod_{i=0}^{i=n-1} (q_{Si})^{N_{Si}} \right) (q_{Sn})^{N_W}$$

where $q_{Si}$ is the maximum linear probability of a confusion element associated with $S_i$, and $S_n$ is associated with a confusion element having a lowest resistance against linear attack. The resistance to linear cryptanalysis of the cipher structure is evaluated based on the calculated maximum linear characteristic probability $P_L$.

In more detailed aspects of the invention, the confusion elements are stored as a baseline. At least one confusion element is changed to provide new confusion elements. The following method steps are repeated for the new confusion elements. A generalized minimum number $N_G$ is determined. For each subset input, a subset number $N_{Si}$ is determined. Each subset number is summed to generate a summed subset number SN. The summed subset number SN is subtracted from the generalized minimum number $N_G$ to generate a worst-case number $N_W$. An upper bound of a maximum linear characteristic probability $P_L$ is calculated. The resistance to linear cryptanalysis of the cipher structure is evaluated based on the calculated maximum linear characteristic probability $P_L$. The new confusion elements is selected as the confusion elements for the cipher structure if the evaluation indicates that the new confusion elements provide better resistance to linear cryptanalysis than the baseline confusion elements.

In other more detailed aspects of the invention, the linear transformation may be maintained fixed between the steps for evaluating the baseline confusion elements and the new confusion elements. The generalized minimum number of non-zero symbols may be a generalized branch number, and each subset number of non-zero symbols may be a subset-specific branch number. Each confusion element may be an S-box having a defined number of inputs and outputs, and the S-box outputs may be determined from the S-box inputs based on a lookup table. The diffusion element may further include a key mixing element.

Another aspect of the invention may reside in an apparatus for evaluating resistance to linear cryptanalysis of a cipher structure having a diffusion element including a linear transformation placed between differently-sized confusion elements at an input of the diffusion element and differently-sized confusion elements at an output of the diffusion element. The apparatus comprises: means for determining a generalized minimum number $N_G$ of non-zero symbols at the input and the output of the diffusion element; means for dividing the input of the diffusion element into subset inputs $S_i$ each having a size corresponding to the size of each confusion element at the diffusion element input; means for determining, for each subset input, a subset number $N_{Si}$ of non-zero symbols at the subset input and the diffusion element output; means for summing each subset number to generate a summed subset number SN; means for subtracting the summed subset number SN from the generalized minimum number $N_G$ to generate a worst-case number $N_W$; means for calculating an upper bound of a maximum linear characteristic probability $P_L$ according to the equation:

$$P_L \le \left( \prod_{i=0}^{i=n-1} (q_{Si})^{N_{Si}} \right) (q_{Sn})^{N_W}$$

where $q_{Si}$ is the maximum linear probability of a confusion element associated with $S_i$, and $S_n$ is associated with a confusion element having a lowest resistance against linear attack; and means for evaluating the resistance to linear cryptanalysis of the cipher structure based on the calculated maximum linear characteristic probability $P_L$.

Another aspect of the invention may reside in an apparatus for evaluating resistance to linear cryptanalysis of a cipher structure having a diffusion element including a linear transformation placed between differently-sized confusion elements at an input of the diffusion element and differently-sized confusion elements at an output of the diffusion element, comprising: a processor configured to: determine a generalized minimum number $N_G$ of non-zero symbols at the input and the output of the diffusion element; divide the input of the diffusion element into subset inputs $S_i$ each having a size corresponding to the size of each confusion element at the diffusion element input; determine, for each subset input, a subset number $N_{Si}$ of non-zero symbols at the subset input and the diffusion element output; sum each subset number to generate a summed subset number SN; subtract the summed subset number SN from the generalized minimum number $N_G$ to generate a worst-case number $N_W$; calculate an upper bound of a maximum linear characteristic probability $P_L$ according to the equation:

$$P_L \le \left( \prod_{i=0}^{i=n-1} (q_{Si})^{N_{Si}} \right) (q_{Sn})^{N_W}$$

where $q_{Si}$ is the maximum linear probability of a confusion element associated with $S_i$, and $S_n$ is associated with a confusion element having a lowest resistance against linear attack; and evaluate the resistance to linear cryptanalysis of the cipher structure based on the calculated maximum linear characteristic probability $P_L$.

Yet another aspect of the invention may reside is computer program product comprising computer readable medium comprising: code for causing a computer to determine a generalized minimum number $N_G$ of non-zero symbols at an input and an output of the diffusion element of a cipher structure having the diffusion element including a linear transformation placed between differently-sized confusion elements at the input of the diffusion element and differently-sized confusion elements at the output of the diffusion element; code for causing a computer to divide the input of the diffusion element into subset inputs $S_i$ each having a size corresponding to the size of each confusion element at the diffusion element input; code for causing a computer to determine, for each subset input, a subset number $N_{Si}$ of non-zero symbols at the subset input and the diffusion element output; code for causing a computer to sum each subset number to generate a summed subset number SN; code for causing a computer to subtract the summed subset number SN from the generalized minimum number $N_G$ to generate a worst-case number $N_W$; code for causing a computer to calculate an upper bound of a maximum linear characteristic probability $P_L$ according to the equation:

$$P_L \le \left( \prod_{i=0}^{i=n-1} (q_{Si})^{N_{Si}} \right) (q_{Sn})^{N_W}$$

where $q_{Si}$ is the maximum linear probability of a confusion element associated with $S_i$, and $S_n$ is associated with a confusion element having a lowest resistance against differential attack; and code for causing a computer to evaluate the resistance to linear cryptanalysis of the cipher structure based on the calculated maximum linear characteristic probability $P_L$.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
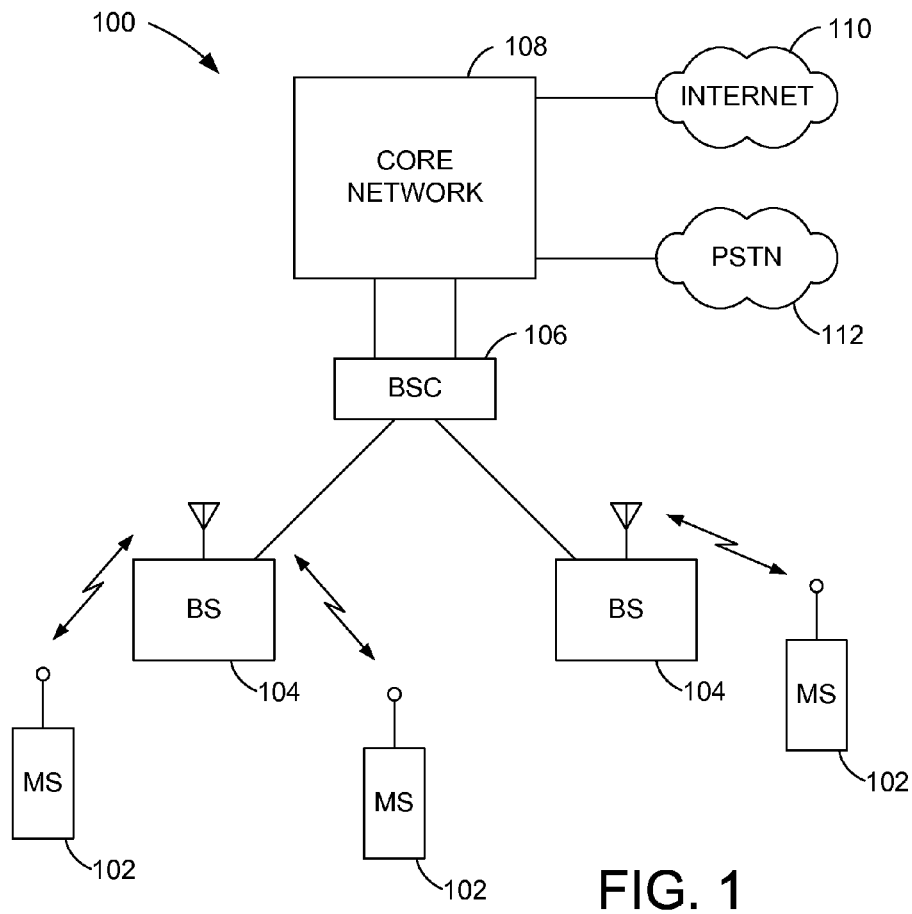
FIG. 1 is a block diagram of an example of a wireless communication system.

With reference to FIG. 1, a wireless communication system 100 includes one or more wireless mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2:
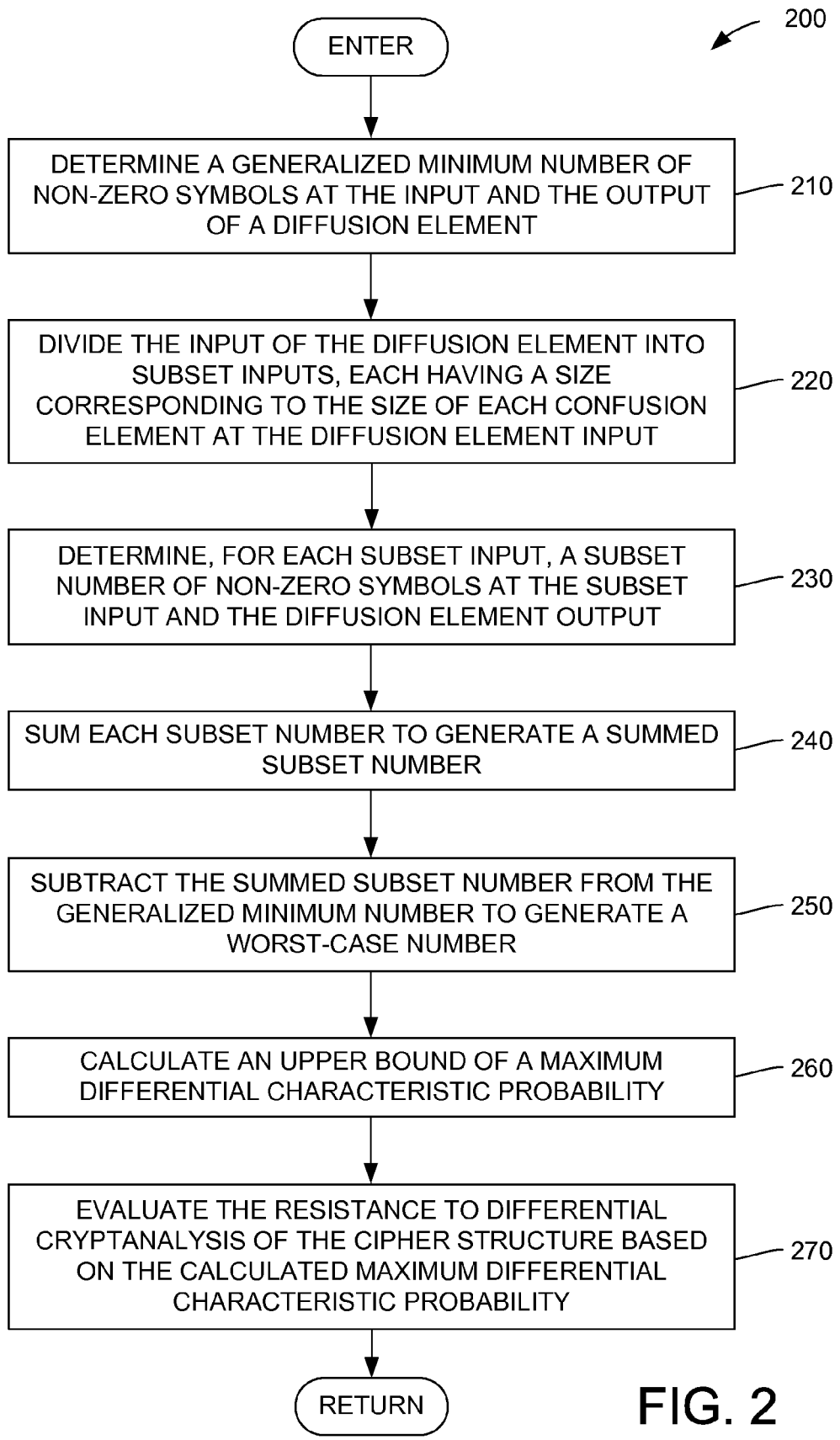
FIG. 2 is a flow diagram of a method for evaluating a cipher structure in terms of resistance to differential cryptanalysis.
Figures 3, 4:
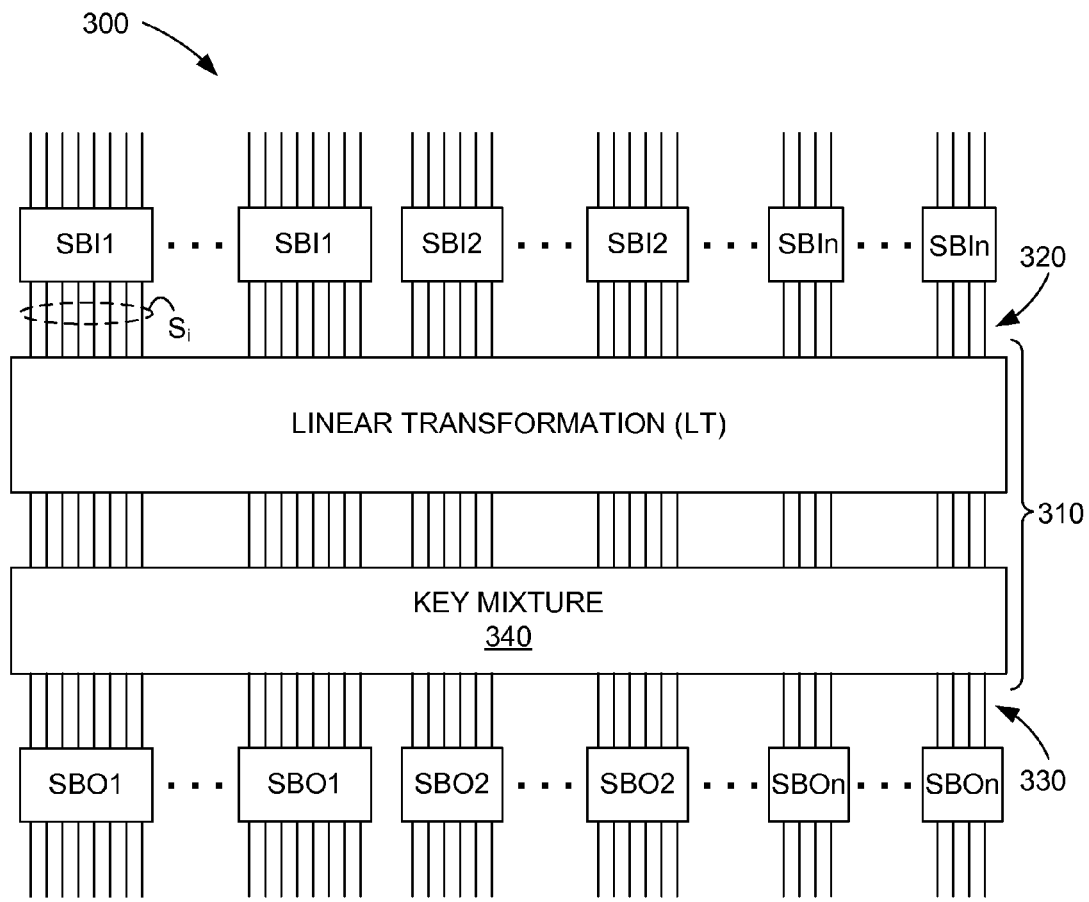
FIG. 3 is a block diagram of a cipher structure.
FIG. 4 is a table showing the derivation of a generalized branch number from subset specific branch numbers.

With reference to FIGS. 2 through 4, an aspect of the present invention may reside in a method 200 for evaluating resistance to differential cryptanalysis of a cipher structure 300 having a diffusion element 310 including a linear transformation LT placed between differently-sized confusion elements, SBI1 to SBIn, at an input 320 of the diffusion element and differently-sized confusion elements, SBO1 to SBOn, at an output 330 of the diffusion element. In the method, a generalized minimum number $N_G$ of non-zero symbols at the input and the output of the diffusion element is determined (step 210). The input of the diffusion element is divided into subset inputs $S_i$ each having a size corresponding to the size of each confusion element at the diffusion element input (step 220). For each subset input, a subset number $N_{Si}$ of non-zero symbols at the subset input and the diffusion element output is determined (step 230). Each subset number is summed to generate a summed subset number SN (step 240). The summed subset number SN is subtracted from the generalized minimum number $N_G$ to generate a worst-case number $N_W$ (step 250). An upper bound of a maximum differential characteristic probability $P_D$ is calculated according to the equation:

$$P_D \leq \left(\prod_{i=0}^{i=n-1} (p_{Si})^{N_{Si}}\right)(p_{Sn})^{N_W}$$

where $p_{Si}$ is the maximum differential probability of a confusion element associated with $S_i$, and $S_n$ is associated with a confusion element having a lowest resistance against differential attack (step 260). The resistance to differential cryptanalysis of the cipher structure is evaluated based on the calculated maximum differential characteristic probability $P_D$ (step 270).

In more detailed aspects of the invention, the generalized minimum number of non-zero symbols may be a generalized branch number, and each subset number of non-zero symbols may be a subset-specific branch number. Each confusion element may be an S-box having a defined number of inputs and outputs, and the S-box outputs may be determined from the S-box inputs based on a lookup table. The diffusion element 310 may further include a key mixing element 340.

For the linear transformation LT, the minimum generalized branch number $N_G$ is defined as the minimum number of nonzero symbols in an input X (X≠0) and an output Y of the linear transformation, regardless of symbol sizes. All symbols are divided into subsets according to the properties of the S-boxes associated with them. The S-box properties include input/output size and resistance against differential attacks. For each subset, a subset branch number $N_{Si}$ is defined as the minimum number of nonzero symbols in this subset for an input X (X≠0) and an output Y of the linear transformation.

The table in FIG. 4 shows how $N_G$ and $N_{Si}$ may be computed for a given linear transformation. Each $N_{Si}$ is computed separately as the minimum of the corresponding column, and has the following features $$0 \leq N_{Si} \leq N_G;$$

$$\sum_{i=1}^{n} N_{Si} \leq N_G$$

A vector N of subset branch numbers if obtained:

$$N = [N_{S1}, N_{S2}, \ldots, N_{Sn}].$$

Each entry of this vector indicates the minimum number of active S-boxes associated with a certain symbol subset. Such a vector is determined by the nature of the linear transformation as well as the locations of the S-boxes. It is desirable to have larger subset branch numbers for those subsets associated with better S-box properties.

This measure N may be used to select a linear transformation with high resistance against differential attacks. Corresponding to the vector N, a vector $P_S$ can be computed as the maximum differential probabilities of S-boxes associated with these symbol subsets:

$$P_S = [p_{S1}, p_{S2}, \ldots, p_{Sn}].$$

Without loss of generality, it may be assumed that the entries N and $P_S$ have been sorted such that $p_{S1} \leq p_{S2} \leq \ldots \leq p_{Sn}$. Subset Sn has the largest value of maximum differential probability $P_S$, which means that S-boxes associated with Sn have the lowest resistance against differential attacks.

A cipher structure in a Substitution-Permutation network is shown in FIG. 3. The combinations of S-boxes in the S-box input layer may be different from the combination of S-boxes in the output layer. For example, the input layer may have t S-boxes of a first type, while the output layer may have t' S-boxes of the same type, where t≠t'. For the cipher structure in FIG. 3, an upper bound of maximum differential characteristic probability may be computed by the following equation:

$$P_D \leq \left( \prod_{i=0}^{i=n-1} (p_{Si})^{N_{Si}} \right) (p_{Sn})^{N_W}$$

where $$N_w = N_G - \sum_{S=1}^{n-1} N_{Si}.$$

It is desirable to use a linear transformation that achieves a smaller $P_D$, which corresponds to higher workload to launch differential attacks. When the S-boxes have been determined, a candidate for linear transformation may be evaluated based on its subset branch numbers and the upper bound of $P_D$, i.e.:

$$\left( \prod_{i=0}^{i=n-1} (p_{Si})^{N_{Si}} \right) (p_{Sn})^{N_W}.$$

Figure 7:
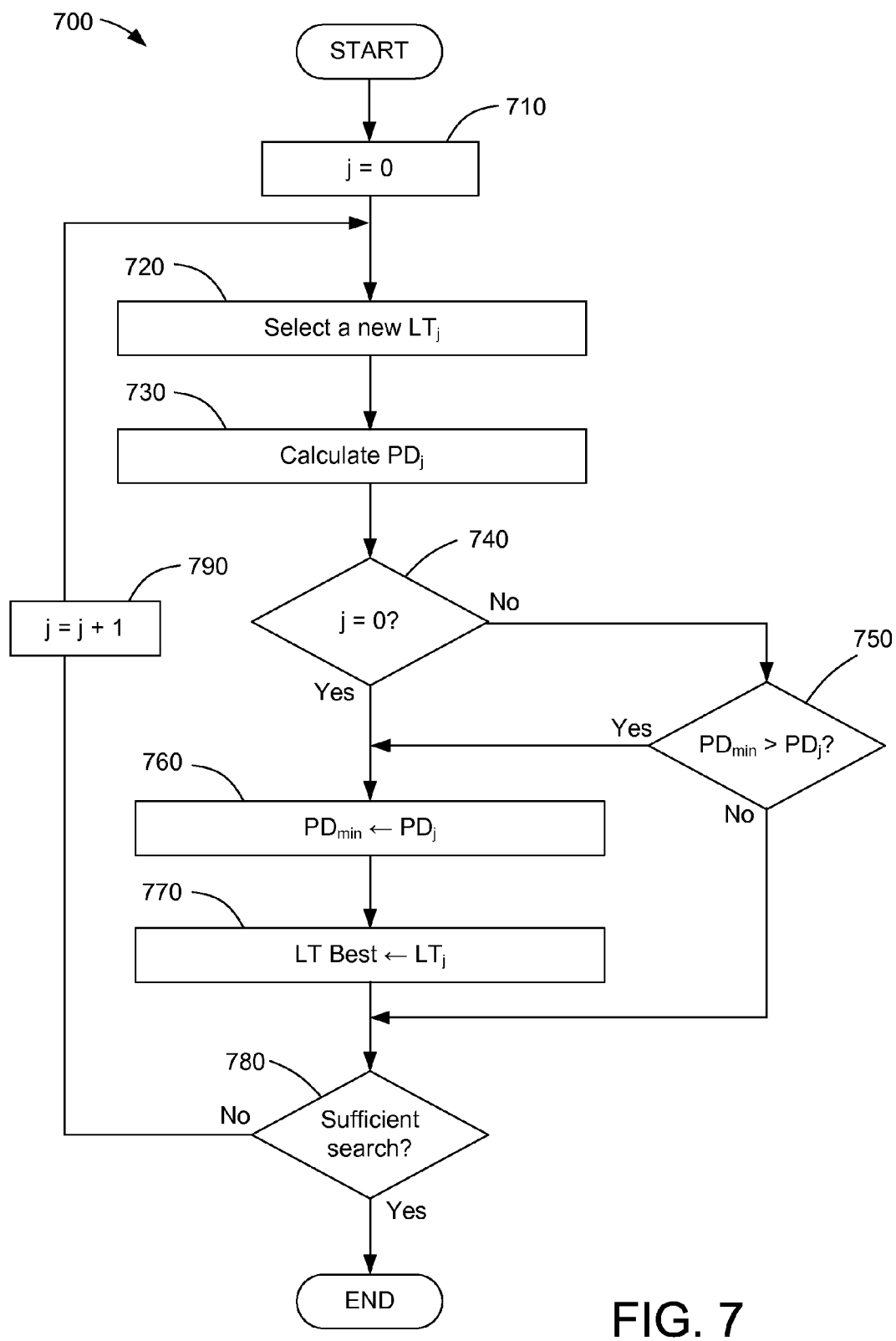
FIG. 7 is a flow diagram of a method for searching for a best linear transform in the cipher structure of FIG. 3.

With reference to FIG. 7, a search may be performed for good diffusion. For a first iteration, j=0 (step 710), the value of $P_D$ and the linear transformation LT are stored as a baseline (steps 740, 760 and 770). The value of j is incremented (step 790), and a new linear transformation $LT_j$ is selected. $P_{Dj}$ is calculated (step 730), and compared with the stored $P_{Dmin}$ (step 750). If $P_{Dj}$ is less than the stored value, then it is stored as $P_{Dmin}$ (step 760), and the corresponding $LT_j$ is stored as the best linear transformation (step 770). The value j is incremented again (step 790), and the process continues until sufficient searching has been performed (step 780), which is determined based on the value of $P_{Dmin}$, the value of j, and available computing power and time frames. The S-boxes may be maintained fixed between the steps for evaluating the baseline linear transformation and the new linear transformation. Alternatively, best S-box selection can be integrated with best linear transformation selection.

Figure 5:
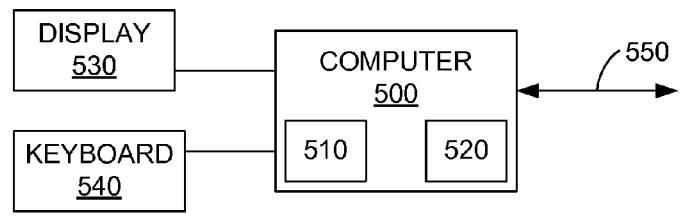
FIG. 5 is a block diagram of a computer including a processor and a memory.

With reference to FIG. 5, another aspect of the invention may reside in an apparatus 500 for evaluating resistance to differential cryptanalysis of a cipher structure 300 having a diffusion element 310 including a linear transformation LT placed between differently-sized confusion elements, SBI1 to SBIn, at an input 320 of the diffusion element and differently-sized confusion elements, SBO1 to SBOn, at an output 330 of the diffusion element. The apparatus comprises: means (processor 510) for determining a generalized minimum number $N_G$ of non-zero symbols at the input and the output of the diffusion element; means 510 for dividing the input of the diffusion element into subset inputs $S_i$ each having a size corresponding to the size of each confusion element at the diffusion element input; means 510 for determining, for each subset input, a subset number $N_{Si}$ of non-zero symbols at the subset input and the diffusion element output; means 510 for summing each subset number to generate a summed subset number SN; means 510 for subtracting the summed subset number SN from the generalized minimum number $N_G$ to generate a worst-case number $N_W$; means 510 for calculating an upper bound of a maximum differential characteristic probability $P_D$ according to the equation:

$$P_D \leq \left( \prod_{i=0}^{i=n-1} (p_{Si})^{N_{Si}} \right) (p_{Sn})^{N_W}$$

where $p_{Si}$ is the maximum differential probability of a confusion element associated with $S_i$, and $S_n$ is associated with a confusion element having a lowest resistance against differential attack; and means 510 for evaluating the resistance to differential cryptanalysis of the cipher structure based on the calculated maximum differential characteristic probability $P_D$. The apparatus may further include a storage medium 520 such as memory, a display 530, and a keyboard 540. The apparatus may include a wired or wireless connection 550.

Another aspect of the invention may reside in an apparatus 500 for evaluating resistance to differential cryptanalysis of a cipher structure 300 having a diffusion element 310 including a linear transformation LT placed between differently-sized confusion elements, SBI1 to SBIn, at an input 320 of the diffusion element and differently-sized confusion elements, SBO1 to SBOn, at an output 330 of the diffusion element. The apparatus comprises a processor 510 configured to: determine a generalized minimum number $N_G$ of non-zero symbols at the input and the output of the diffusion element; divide the input of the diffusion element into subset inputs $S_i$ each having a size corresponding to the size of each confusion element at the diffusion element input; determine, for each subset input, a subset number $N_{Si}$ of non-zero symbols at the subset input and the diffusion element output; sum each subset number to generate a summed subset number SN; subtract the summed subset number SN from the generalized minimum number $N_G$ to generate a worst-case number $N_W$; calculate an upper bound of a maximum differential characteristic probability $P_D$ according to the equation:

$$P_D \leq \left(\prod_{i=0}^{i=n-1} (p_{Si})^{N_{Si}}\right)(p_{Sn})^{N_W}$$

where $p_{Si}$ is the maximum differential probability of a confusion element associated with $S_i$, and $S_n$ is associated with a confusion element having a lowest resistance against differential attack; and evaluate the resistance to differential cryptanalysis of the cipher structure based on the calculated maximum differential characteristic probability $P_D$.

Yet another aspect of the invention may reside is computer program product comprising computer readable medium 520 comprising: code for causing a computer 500 to determine a generalized minimum number $N_G$ of non-zero symbols at an input and an output of the diffusion element 310 of a cipher structure 300 having the diffusion element including a linear transformation LT placed between differently-sized confusion elements, SBI1 to SBIn, at the input 320 of the diffusion element and differently-sized confusion elements at the output 330 of the diffusion element; code for causing a computer to divide the input of the diffusion element into subset inputs $S_i$ each having a size corresponding to the size of each confusion element at the diffusion element input; code for causing a computer to determine, for each subset input, a subset number $N_{Si}$ of non-zero symbols at the subset input and the diffusion element output; code for causing a computer to sum each subset number to generate a summed subset number SN; code for causing a computer to subtract the summed subset number SN from the generalized minimum number $N_G$ to generate a worst-case number $N_W$; code for causing a computer to calculate an upper bound of a maximum differential characteristic probability $P_D$ according to the equation:

$$P_D \leq \left(\prod_{i=0}^{i=n-1} (p_{Si})^{N_{Si}}\right)(p_{Sn})^{N_W}$$

where $p_{Si}$ is the maximum differential probability of a confusion element associated with $S_i$, and $S_n$ is associated with a confusion element having a lowest resistance against differential attack; and code for causing a computer to evaluate the resistance to differential cryptanalysis of the cipher structure based on the calculated maximum differential characteristic probability $P_D$.

Similar to the maximum differential probabilities vector $P_S$, a vector $Q_S$ of maximum linear probabilities of S-boxes associated with the subsets may be defined as:

$Q_S=[q_{S1}, q_{S2}, \ldots, q_{Sn}]$.

Then, an upper bound of maximum linear characteristic probability $P_L$ may be computed by the following equation:

$$P_L \leq \left(\prod_{i=0}^{i=n-1} (q_{Si})^{N_{Si}}\right)(q_{Sn})^{N_W}.$$

The upper bound should be as small as possible, which corresponds to higher workload to launch linear attacks.

Figure 6:
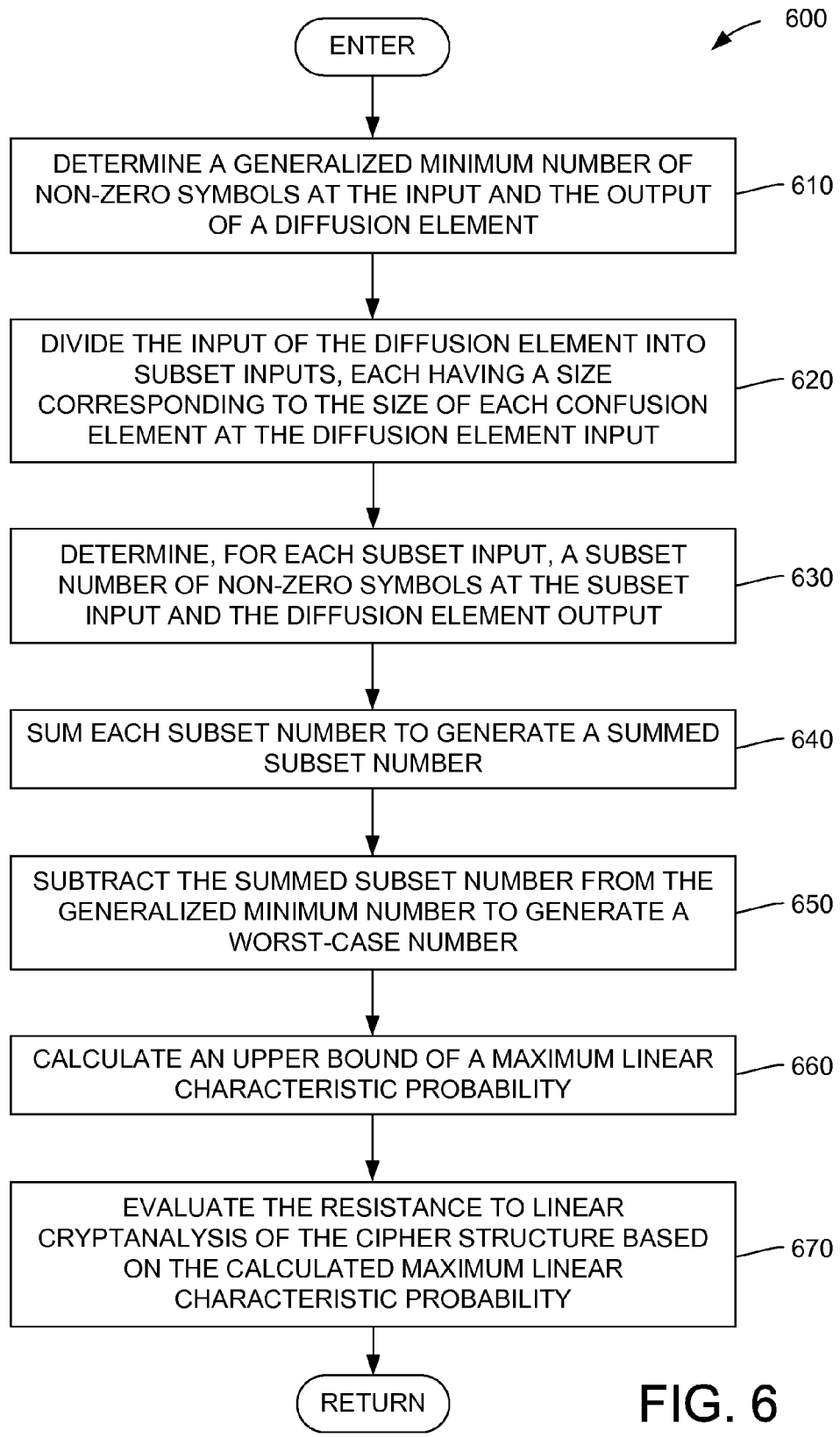
FIG. 6 is a flow diagram of a method for evaluating a cipher structure in terms of resistance to linear cryptanalysis.

Thus, with respect to FIG. 6, a similar aspect of the present invention may reside in a method 600 for evaluating resistance to linear cryptanalysis of a cipher structure 300 having a diffusion element 310 including a linear transformation LT placed between differently-sized confusion elements, SBI1 to SBIn, at an input 320 of the diffusion element and differently-sized confusion elements, SBO1 to SBOn, at an output 330 of the diffusion element. In the method, a generalized minimum number $N_G$ of non-zero symbols at the input and the output of the diffusion element is determined (step 610). The input of the diffusion element is divided into subset inputs $S_i$ each having a size corresponding to the size of each confusion element at the diffusion element input (step 620). For each subset input, a subset number $N_{Si}$ of non-zero symbols at the subset input and the diffusion element output is determined (step 630). Each subset number is summed to generate a summed subset number SN (step 640). The summed subset number SN is subtracted from the generalized minimum number $N_G$ to generate a worst-case number $N_W$ (step 650). An upper bound of a maximum linear characteristic probability $P_L$ is calculated according to the equation:

$$P_L \leq \left(\prod_{i=0}^{i=n-1} (q_{Si})^{N_{Si}}\right)(q_{Sn})^{N_W}$$

where $q_{Si}$ is the maximum linear probability of a confusion element associated with $S_i$, and $S_n$ is associated with a confusion element having a lowest resistance against linear attack (step 660). The resistance to linear cryptanalysis of the cipher structure is evaluated based on the calculated maximum linear characteristic probability $P_L$ (step 670).

Figure 8:
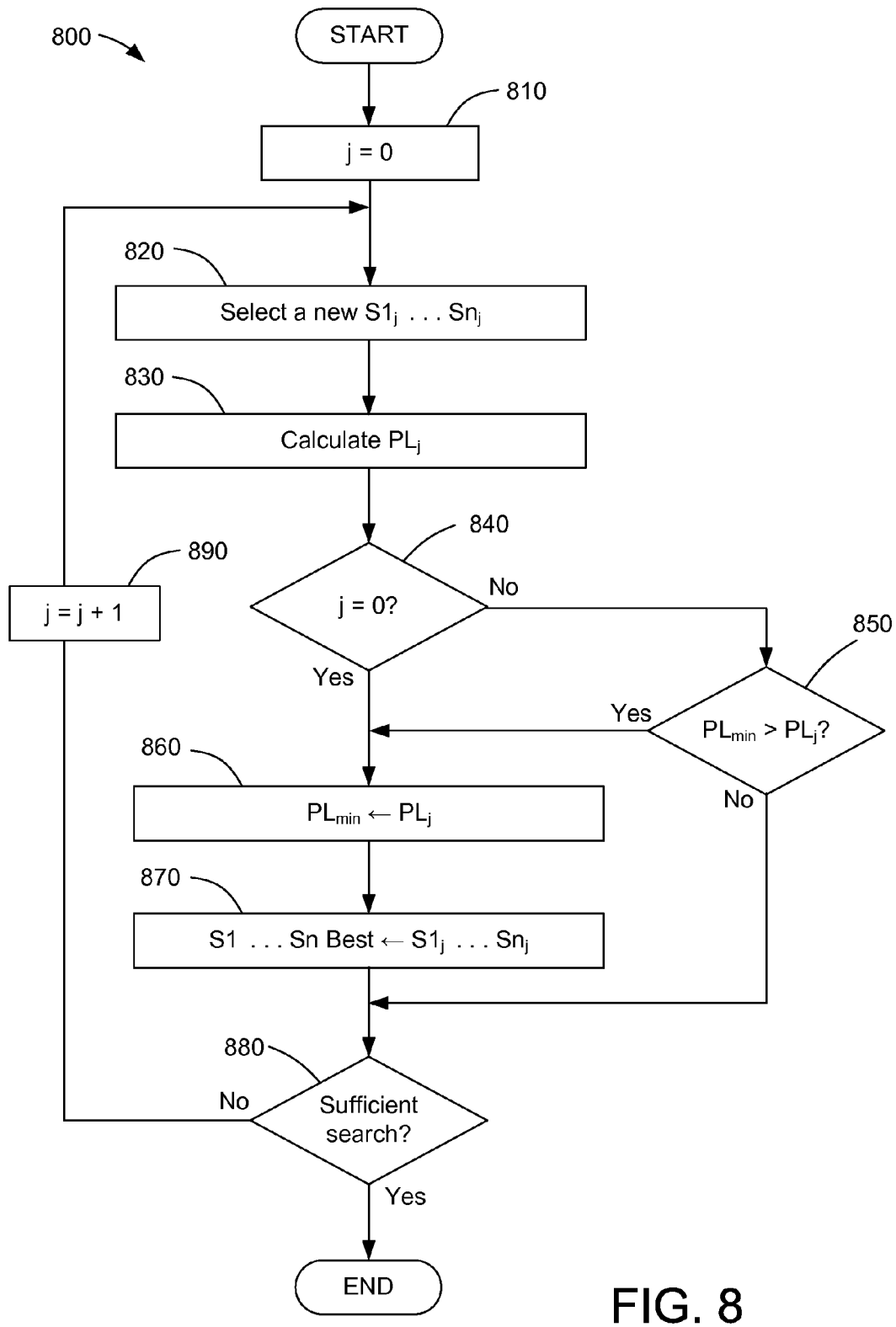
FIG. 8 is a flow diagram of a method for searching for best S-boxes in the cipher structure of FIG. 3.

With reference to FIG. 8, a search may be performed for good confusion by the S-boxes. For a first iteration, j=0 (step 810), the value of $P_L$ and the confusion elements are stored as a baseline (steps 840, 860 and 870). The value of j is incremented (step 890), and at least one confusion element is changed to provide new confusion elements. $P_{Lj}$ is calculated (step 830), and compared with the stored $P_{Lmin}$ (step 850). If $P_{Lj}$ is less than the stored value, then it is stored as $P_{Lmin}$ (step 860), and the corresponding confusion elements are stored as best (step 870). The value j is incremented again (step 890), and the process continues until sufficient searching has been performed (step 880), which is determined based on the value of $P_{Lmin}$, the value of j, and available computing power and time frames. The linear transformation LT may be maintained fixed between the steps for evaluating the baseline confusion elements and the new confusion elements. Alternatively, best linear transformation selection can be integrated with the selection of the confusion elements/S-boxes.

With reference again to FIG. 5, another aspect of the invention may reside in an apparatus 500 for evaluating resistance to linear cryptanalysis of a cipher structure 300 having a diffusion element 310 including a linear transformation LT placed between differently-sized confusion elements at an input 310 of the diffusion element and differently-sized confusion elements at an output 320 of the diffusion element. The apparatus comprises: means (processor 510) for determining a generalized minimum number $N_G$ of non-zero symbols at the input and the output of the diffusion element; means 510 for dividing the input of the diffusion element into subset inputs $S_i$ each having a size corresponding to the size of each confusion element at the diffusion element input; means 510 for determining, for each subset input, a subset number $N_{Si}$ of non-zero symbols at the subset input and the diffusion element output; means 510 for summing each subset number to generate a summed subset number SN; means 510 for subtracting the summed subset number SN from the generalized minimum number $N_G$ to generate a worst-case number $N_W$; means 510 for calculating an upper bound of a maximum linear characteristic probability $P_L$ according to the equation:

$$P_L \leq \left(\prod_{i=0}^{i=n-1} (q_{Si})^{N_{Si}}\right)(q_{Sn})^{N_W}$$

where $q_{Si}$ is the maximum linear probability of a confusion element associated with $S_i$, and $S_n$ is associated with a confusion element having a lowest resistance against linear attack; and means 510 for evaluating the resistance to linear cryptanalysis of the cipher structure based on the calculated maximum linear characteristic probability $P_L$.

Another aspect of the invention may reside in an apparatus 500 for evaluating resistance to linear cryptanalysis of a cipher structure 300 having a diffusion element 310 including a linear transformation LT placed between differently-sized confusion elements at an input 320 of the diffusion element and differently-sized confusion elements at an output 330 of the diffusion element. The apparatus comprises a processor 510 configured to: determine a generalized minimum number $N_G$ of non-zero symbols at the input and the output of the diffusion element; divide the input of the diffusion element into subset inputs $S_i$ each having a size corresponding to the size of each confusion element at the diffusion element input; determine, for each subset input, a subset number $N_{Si}$ of non-zero symbols at the subset input and the diffusion element output; sum each subset number to generate a summed subset number SN; subtract the summed subset number SN from the generalized minimum number $N_G$ to generate a worst-case number $N_W$; calculate an upper bound of a maximum linear characteristic probability $P_L$ according to the equation:

$$P_L \leq \left(\prod_{i=0}^{i=n-1} (q_{Si})^{N_{Si}}\right)(q_{Sn})^{N_W}$$

where $q_{Si}$ is the maximum linear probability of a confusion element associated with $S_i$, and $S_n$ is associated with a confusion element having a lowest resistance against linear attack; and evaluate the resistance to linear cryptanalysis of the cipher structure based on the calculated maximum linear characteristic probability $P_L$.

Yet another aspect of the invention may reside is computer program product comprising computer readable medium 520 comprising: code for causing a computer 500 to determine a generalized minimum number $N_G$ of non-zero symbols at an input and an output of the diffusion element 310 of a cipher structure 300 having the diffusion element including a linear transformation LT placed between differently-sized confusion elements at the input 320 of the diffusion element and differently-sized confusion elements at the output 330 of the diffusion element; code for causing a computer to divide the input of the diffusion element into subset inputs $S_i$ each having a size corresponding to the size of each confusion element at the diffusion element input; code for causing a computer to determine, for each subset input, a subset number $N_{Si}$ of non-zero symbols at the subset input and the diffusion element output; code for causing a computer to sum each subset number to generate a summed subset number SN; code for causing a computer to subtract the summed subset number SN from the generalized minimum number $N_G$ to generate a worst-case number $N_W$; code for causing a computer to calculate an upper bound of a maximum linear characteristic probability $P_L$ according to the equation:

$$P_L \leq \left(\prod_{i=0}^{i=n-1} (q_{Si})^{N_{Si}}\right)(q_{Sn})^{N_W}$$

where $q_{Si}$ is the maximum linear probability of a confusion element associated with $S_i$, and $S_n$ is associated with a confusion element having a lowest resistance against differential attack; and code for causing a computer to evaluate the resistance to linear cryptanalysis of the cipher structure based on the calculated maximum linear characteristic probability $P_L$.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method operational in an apparatus for evaluating resistance to differential cryptanalysis of a cipher structure having a diffusion element including a linear transformation placed between differently-sized confusion elements at an input of the diffusion element and differently-sized confusion elements at an output of the diffusion element, the method comprising:

determining, at the apparatus, a generalized minimum number $N_G$ of non-zero symbols at the input and the output of the diffusion element;

dividing the input of the diffusion element into subset inputs $S_i$ each having a size corresponding to the size of each confusion element at the diffusion element input;

determining, for each subset input, a subset number $N_{Si}$ of non-zero symbols at the subset input and the diffusion element output;

summing each subset number to generate a summed subset number SN;

subtracting the summed subset number SN from the generalized minimum number $N_G$ to generate a worst-case number $N_W$;

calculating an upper bound of a maximum differential characteristic probability $P_D$ according to the equation:

$$P_D \leq \left( \prod_{i=0}^{i=n-1} (p_{Si})^{N_{Si}} \right) (p_{Sn})^{N_W}$$

where $P_{Si}$ is the maximum differential probability of a confusion element associated with $S_i$ and $S_n$ is associated with a confusion element having a lowest resistance against differential attack; and evaluating the resistance to differential cryptanalysis of the cipher structure based on the calculated maximum differential characteristic probability $P_D$.

2. The method of claim 1, further comprising:

storing the linear transformation as a baseline linear transformation;

changing the linear transformation to a new linear transformation;

repeating, for the new linear transformation, the method steps of:

determining a generalized minimum number $N_G$;

determining, for each subset input, a subset number $N_{Si}$;

summing each subset number to generate a summed subset number SN;

subtracting the summed subset number SN from the generalized minimum number $N_G$ to generate a worst-case number $N_W$;

calculating an upper bound of a maximum differential characteristic probability $P_D$;

evaluating the resistance to differential cryptanalysis of the cipher structure based on the calculated maximum differential characteristic probability $P_D$; and selecting the new linear transformation as the linear transformation for the cipher structure if the evaluation indicates that the new linear transformation provides better resistance to differential cryptanalysis than the baseline linear transformation.

3. The method of claim 2, wherein each confusion element is an S-box, and the S-boxes are maintained fixed between the steps for evaluating the baseline linear transformation and the new linear transformation.

4. The method of claim 1, wherein the generalized minimum number of non-zero symbols is a generalized branch number, and each subset number of non-zero symbols is a subset-specific branch number.

5. The method of claim 1, wherein each confusion element is an S-box having a defined number of inputs and outputs, and the S-box outputs are determined from the S-box inputs based on a lookup table.

6. The method of claim 1, wherein the diffusion element further includes a key mixing element.

7. An apparatus for evaluating resistance to differential cryptanalysis of a cipher structure having a diffusion element including a linear transformation placed between differently-sized confusion elements at an input of the diffusion element and differently-sized confusion elements at an output of the diffusion element, comprising:

means for determining a generalized minimum number $N_G$ of non-zero symbols at the input and the output of the diffusion element;

means for dividing the input of the diffusion element into subset inputs $S_i$ each having a size corresponding to the size of each confusion element at the diffusion element input;

means for determining, for each subset input, a subset number $N_{Si}$ of non-zero symbols at the subset input and the diffusion element output;

means for summing each subset number to generate a summed subset number SN;

means for subtracting the summed subset number SN from the generalized minimum number $N_G$ to generate a worst-case number $N_W$;

means for calculating an upper bound of a maximum differential characteristic probability $P_D$ according to the equation:

$$P_D \leq \left( \prod_{i=0}^{i=n-1} (p_{Si})^{N_{Si}} \right)(p_{Sn})^{N_W}$$

where $P_{Si}$ is the maximum differential probability of a confusion element associated with $S_i$, and $S_n$ is associated with a confusion element having a lowest resistance against differential attack; and means for evaluating the resistance to differential cryptanalysis of the cipher structure based on the calculated maximum differential characteristic probability $P_D$.

8. The apparatus of claim 7, wherein the generalized minimum number of non-zero symbols is a generalized branch number; and each subset number of non-zero symbols is a subset-specific branch number.

9. The apparatus of claim 7, wherein each confusion element is an S-box having a defined number of inputs and outputs, and the S-box outputs are determined from the S-box inputs based on a lookup table.

10. The apparatus of claim 7, wherein the diffusion element further includes a key mixing element.

11. An apparatus for evaluating resistance to differential cryptanalysis of a cipher structure having a diffusion element including a linear transformation placed between differently-sized confusion elements at an input of the diffusion element and differently-sized confusion elements at an output of the diffusion element, comprising:

a processing device configured to:
determine a generalized minimum number $N_G$ of non-zero symbols at the input and the output of the diffusion element;
divide the input of the diffusion element into subset inputs $S_i$ each having a size corresponding to the size of each confusion element at the diffusion element input;
determine, for each subset input, a subset number $N_{Si}$ of non-zero symbols at the subset input and the diffusion element output;
sum each subset number to generate a summed subset number SN;
subtract the summed subset number SN from the generalized minimum number $N_G$ to generate a worst-case number $N_W$;
calculate an upper bound of a maximum differential characteristic probability $P_D$ according to the equation $$P_D \leq \left( \prod_{i=0}^{i=n-1} (p_{Si})^{N_{Si}} \right)(p_{Sn})^{N_W}$$

where $P_{Si}$ is the maximum differential probability of a confusion element associated with $S_i$, and $S_n$ is associated with a confusion element having a lowest resistance against differential attack; and
evaluate the resistance to differential cryptanalysis of the cipher structure based on the calculated maximum differential characteristic probability $P_D$.

12. The apparatus of claim 11, wherein the generalized minimum number of non-zero symbols is a generalized branch number, and each subset number of non-zero symbols is a subset-specific branch number.

13. The apparatus of claim 11, wherein each confusion element is an S-box having a defined number of inputs and outputs, and the S-box outputs are determined from the S-box inputs based on a lookup table.

14. The apparatus of claim 11, wherein the diffusion element further includes a key mixing element.

15. A computer program product, comprising:
a non-transitory computer-readable medium, comprising:
code for causing a computer to determine a generalized minimum number $N_G$ of non-zero symbols at an input and an output of the diffusion element of a cipher structure having the diffusion element including a linear transformation placed between differently-sized confusion elements at the input of the diffusion element and differently-sized confusion elements at the output of the diffusion element;
code for causing a computer to divide the input of the diffusion element into subset inputs $S_i$ each having a size corresponding to the size of each confusion element at the diffusion element input;
code for causing a computer to determine, for each subset input, a subset number $N_{Si}$ of non-zero symbols at the subset input and the diffusion element output;
code for causing a computer to sum each subset number to generate a summed subset number SN;
code for causing a computer to subtract the summed subset number SN from the generalized minimum number $N_G$ to generate a worst-case number $N_W$;
code for causing a computer to calculate an upper bound of a maximum differential characteristic probability $P_D$ according to the equation:

$$P_L \leq \left( \prod_{i=0}^{i=n-1} (q_{Si})^{N_{Si}} \right)(q_{Sn})^{N_W}$$

where $P_{Si}$ is the maximum differential probability of a confusion element associated with $S_i$, and $S_n$ is associated with a confusion element having a lowest resistance against differential attack; and
code for causing a computer to evaluate the resistance to differential cryptanalysis of the cipher structure based on the calculated maximum differential characteristic probability $P_D$.

16. The computer program product of claim 15, wherein the generalized minimum number of non-zero symbols is a generalized branch number, and each subset number of non-zero symbols is a subset-specific branch number.

17. The computer program product of claim 15, wherein each confusion element is an S-box having a defined number of inputs and outputs, and the S-box outputs are determined from the S-box inputs based on a lookup table.

18. The computer program product of claim 15, wherein the diffusion element further includes a key mixing element.

19. A method operational in an apparatus for evaluating resistance to linear cryptanalysis of a cipher structure having a diffusion element including a linear transformation placed between differently-sized confusion elements at an input of the diffusion element and differently-sized confusion elements at an output of the diffusion element, the method comprising:

determining, at the apparatus, a generalized minimum number $N_G$ of non-zero symbols at the input and the output of the diffusion element;

dividing the input of the diffusion element into subset inputs $S_i$ each having a size corresponding to the size of each confusion element at the diffusion element input;

determining, for each subset input, a subset number $N_{Si}$ of non-zero symbols at the subset input and the diffusion element output;

summing each subset number to generate a summed subset number SN;

subtracting the summed subset number SN from the generalized minimum number $N_G$ to generate a worst-case number $N_W$;

calculating an upper bound of a maximum linear characteristic probability $P_L$ according to the equation:

$$P_L \le \left( \prod_{i=0}^{i=n-1} (q_{Si})^{N_{Si}} \right) (q_{Sn})^{N_W}$$

where $q_{Si}$ is the maximum linear probability of a confusion element associated with $S_i$, and $S_n$ is associated with a confusion element having a lowest resistance against linear attack; and evaluating the resistance to linear cryptanalysis of the cipher structure based on the calculated maximum linear characteristic probability $P_L$.

20. The method of claim 19, further comprising:
storing the confusion elements as a baseline;
changing at least one confusion element to provide new confusion elements;
repeating, for the new confusion elements, the method steps of:
determining a generalized minimum number $N_G$;
determining, for each subset input, a subset number NSi;
summing each subset number to generate a summed subset number SN;
subtracting the summed subset number SN from the generalized minimum number $N_G$ to generate a worst-case number $N_W$;
calculating an upper bound of a maximum linear characteristic probability $P_L$;
evaluating the resistance to linear cryptanalysis of the cipher structure based on the calculated maximum linear characteristic probability $P_L$; and
selecting the new confusion elements as the confusion elements for the cipher structure if the evaluation indicates that the new confusion elements provide better resistance to linear cryptanalysis than the baseline confusion elements.

21. The method of claim 20, wherein the linear transformation is maintained fixed between the steps for evaluating.

22. The method of claim 19, wherein the generalized minimum number of non-zero symbols is a generalized branch number, and each subset number of non-zero symbols is a subset-specific branch number.

23. The method of claim 19, wherein each confusion element is an S-box having a defined number of inputs and outputs, and the S-box outputs are determined from the S-box inputs based on a lookup table.

24. The method of claim 19, wherein the diffusion element further includes a key mixing element.

25. An apparatus for evaluating resistance to linear cryptanalysis of a cipher structure having a diffusion element including a linear transformation placed between differently-sized confusion elements at an input of the diffusion element and differently-sized confusion elements at an output of the diffusion element, comprising:

means for determining a generalized minimum number $N_G$ of non-zero symbols at the input and the output of the diffusion element;

means for dividing the input of the diffusion element into subset inputs $S_i$ each having a size corresponding to the size of each confusion element at the diffusion element input;

means for determining, for each subset input, a subset number $N_{Si}$ of non-zero symbols at the subset input and the diffusion element output;

means for summing each subset number to generate a summed subset number SN;

means for subtracting the summed subset number SN from the generalized minimum number $N_G$ to generate a worst-case number $N_W$;

means for calculating an upper bound of a maximum linear characteristic probability $P_L$ according to the equation:

$$P_L \le \left( \prod_{i=0}^{i=n-1} (q_{Si})^{N_{Si}} \right) (q_{Sn})^{N_W}$$

where $q_{Si}$ is the maximum linear probability of a confusion element associated with $S_i$, and $S_n$ is associated with a confusion element having a lowest resistance against linear attack; and means for evaluating the resistance to linear cryptanalysis of the cipher structure based on the calculated maximum linear characteristic probability $P_L$.

26. The apparatus of claim 25, wherein the generalized minimum number of non-zero symbols is a generalized branch number, and each subset number of non-zero symbols is a subset-specific branch number.

27. The apparatus of claim 25, wherein each confusion element is an S-box having a defined number of inputs and outputs, and the S-box outputs are determined from the S-box inputs based on a lookup table.

28. The apparatus of claim 25, wherein the diffusion element further includes a key mixing element.

29. An apparatus for evaluating resistance to linear cryptanalysis of a cipher structure having a diffusion element including a linear transformation placed between differently-sized confusion elements at an input of the diffusion element and differently-sized confusion elements at an output of the diffusion element, comprising:

a processing device configured to:
determine a generalized minimum number $N_G$ of non-zero symbols at the input and the output of the diffusion element;

divide the input of the diffusion element into subset inputs $S_i$ each having a size corresponding to the size of each confusion element at the diffusion element input;

determine, for each subset input, a subset number $N_{Si}$ of non-zero symbols at the subset input and the diffusion element output;

sum each subset number to generate a summed subset number SN;

subtract the summed subset number SN from the generalized minimum number $N_G$ to generate a worst-case number $N_W$;

calculate an upper bound of a maximum linear characteristic probability $P_L$ according to the equation:

$$P_L \leq \left( \prod_{i=0}^{i=n-1} (q_{Si})^{N_{Si}} \right) (q_{Sn})^{N_W}$$

where $q_{Si}$ is the maximum linear probability of a confusion element associated with $S_i$, and $S_n$ is associated with a confusion element having a lowest resistance against linear attack; and evaluate the resistance to linear cryptanalysis of the cipher structure based on the calculated maximum linear characteristic probability $P_L$.

30. The apparatus of claim 29, wherein the generalized minimum number of non-zero symbols is a generalized branch number, and each subset number of non-zero symbols is a subset-specific branch number.

31. The apparatus of claim 29, wherein each confusion element is an S-box having a defined number of inputs and outputs, and the S-box outputs are determined from the S-box inputs based on a lookup table.

32. The apparatus of claim 29, wherein the diffusion element further includes a key mixing element.

33. A computer program product, comprising:
a non-transitory computer-readable medium, comprising:
code for causing a computer to determine a generalized minimum number $N_G$ of non-zero symbols at an input and an output of the diffusion element of a cipher structure having the diffusion element including a linear transformation placed between differently-sized confusion elements at the input of the diffusion element and differently-sized confusion elements at the output of the diffusion element;
code for causing a computer to divide the input of the diffusion element into subset inputs $S_i$ each having a size corresponding to the size of each confusion element at the diffusion element input;
code for causing a computer to determine, for each subset input, a subset number $N_{Si}$ of non-zero symbols at the subset input and the diffusion element output;
code for causing a computer to sum each subset number to generate a summed subset number SN;
code for causing a computer to subtract the summed subset number SN from the generalized minimum number $N_G$ to generate a worst-case number $N_W$;
code for causing a computer to calculate an upper bound of a maximum linear characteristic probability $P_L$ according to the equation:

$$P_L \leq \left( \prod_{i=0}^{i=n-1} (q_{Si})^{N_{Si}} \right) (q_{Sn})^{N_W}$$

where $q_{Si}$ is the maximum linear probability of a confusion element associated with $S_i$, and $S_n$ is associated with a confusion element having a lowest resistance against linear attack; and code for causing a computer to evaluate the resistance to linear cryptanalysis of the cipher structure based on the calculated maximum linear characteristic probability $P_L$.

34. The computer program product of claim 33, wherein the generalized minimum number of non-zero symbols is a generalized branch number, and each subset number of non-zero symbols is a subset-specific branch number.

35. A computer program product as defined in claim 29, wherein the station identifier facilitates communication with another station.

36. A computer program product as defined in claim 29, wherein the station identifier facilitates communication with another station.

* * * * *